Nov. 11, 1924.
A. E. NORRIS
1,515,400
BRAKE
Filed March 14, 1921 3 Sheets-Sheet 1
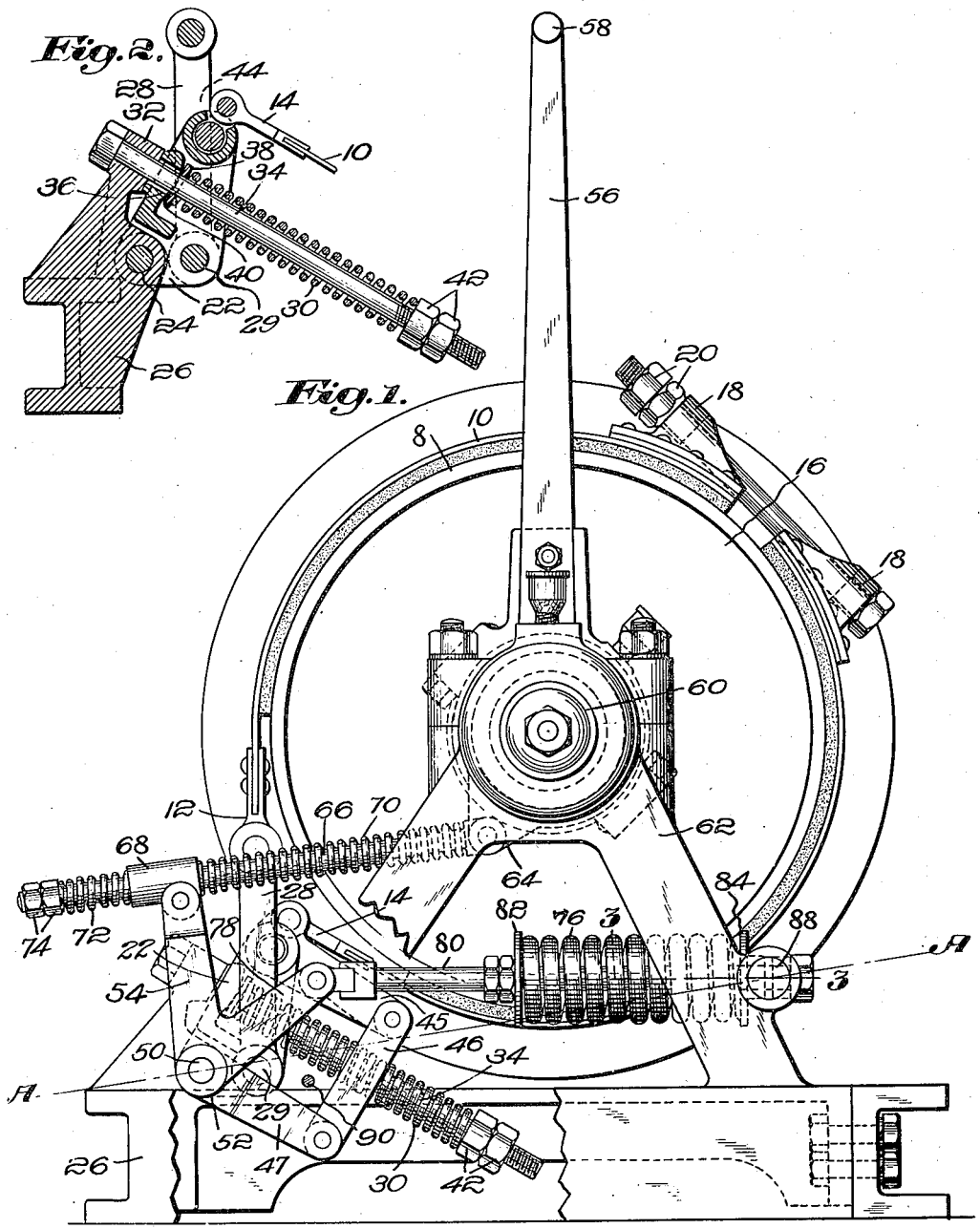

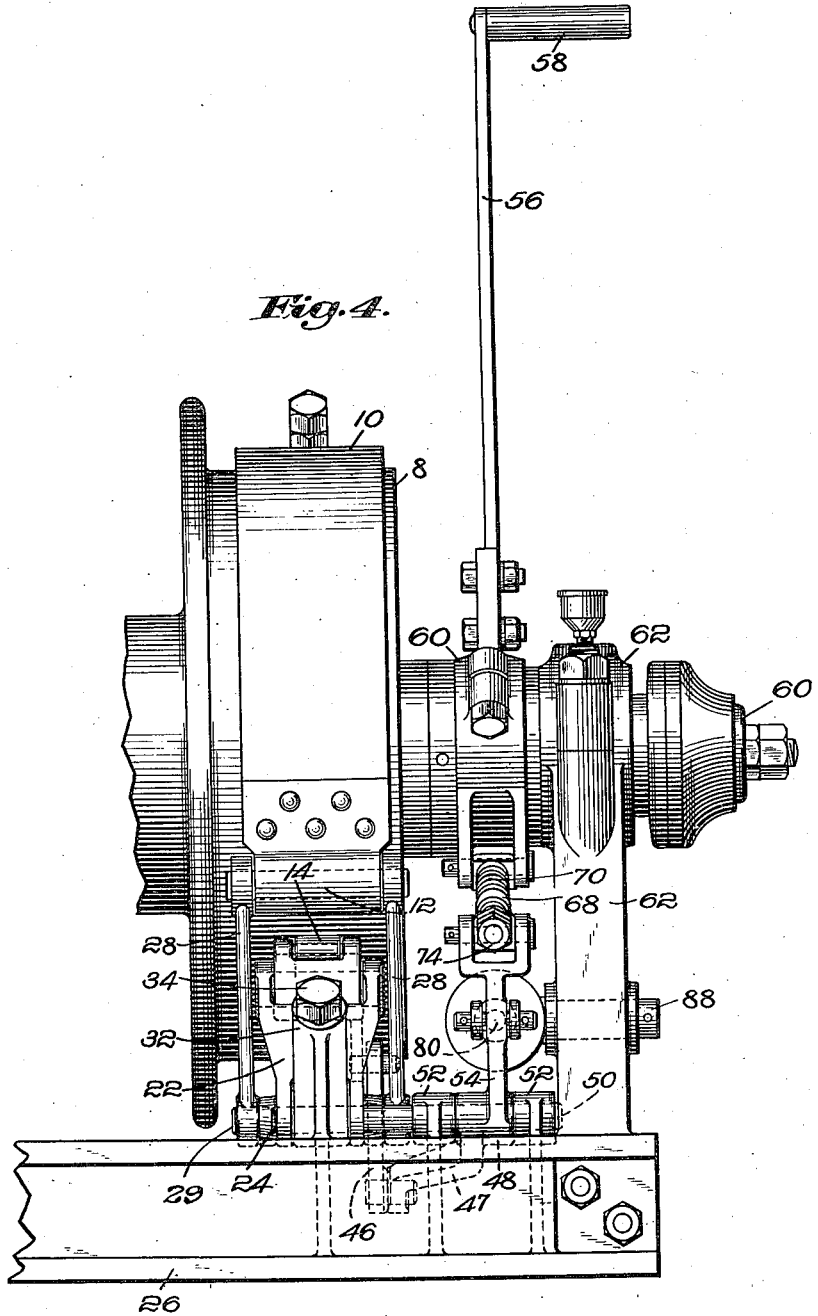

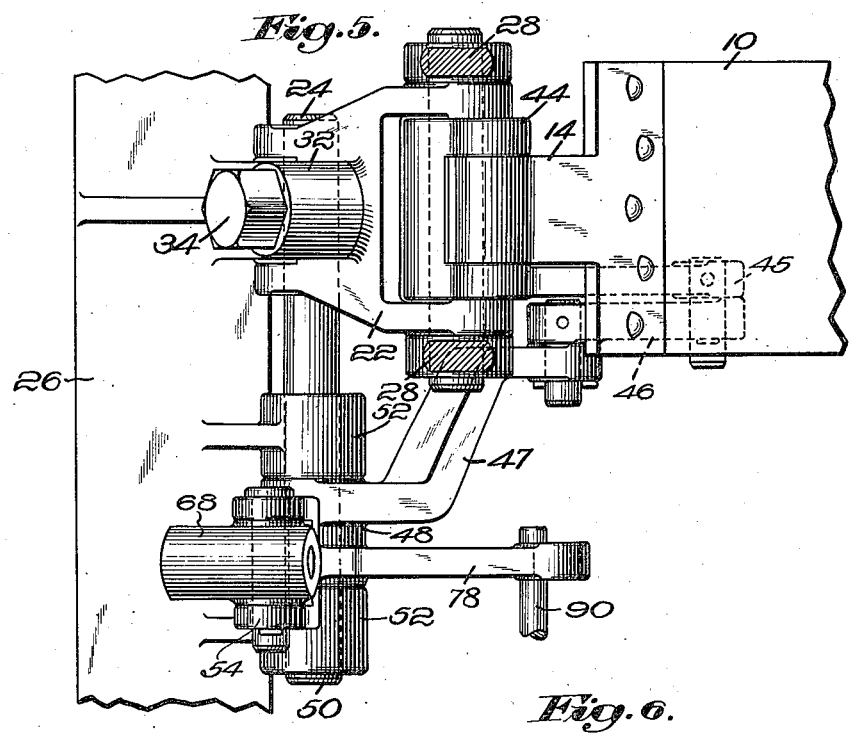
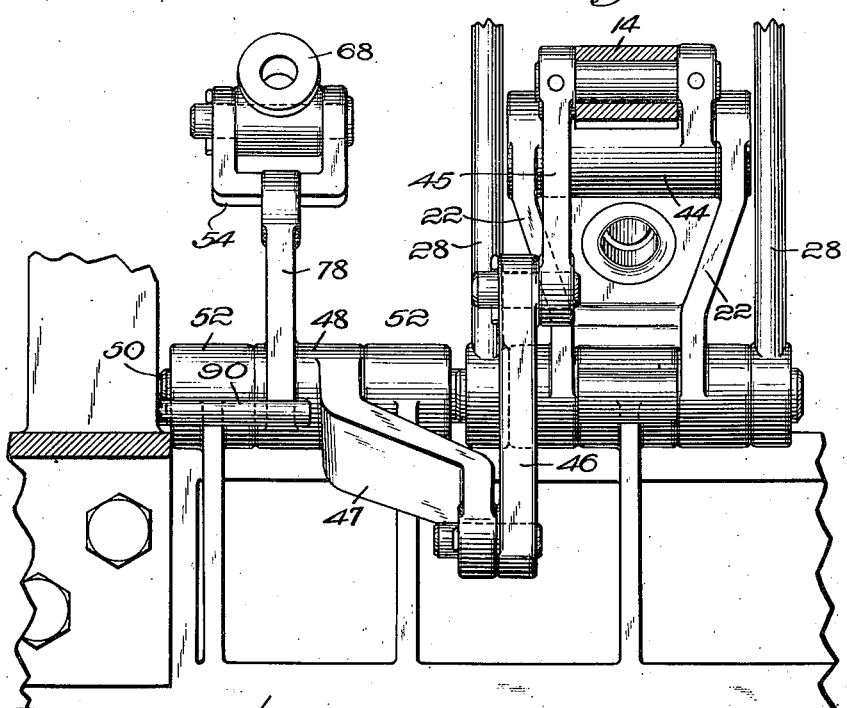

Patented Nov. 11, 1924.

1,515,400

UNITED STATES PATENT OFFICE.

ALMON E. NORRIS, OF BROOKLINE, MASSACHUSETTS.

BRAKE.

Application filed March 14, 1921. Serial No. 452,393.

*To all whom it may concern:*

Be it known that I, ALMON E. NORRIS, a citizen of the United States, and a resident of Brookline, in the county of Norfolk and State of Massachusetts, have invented an Improvement in Brakes, of which the following description, in connection with the accompanying drawings, is a specification, like characters on the drawings representing like parts.

This invention relates to brakes and is more especially though not exclusively concerned with brakes of the class in which the brake is normally automatic in its action but may be released at the will of the operator. In some of its aspects the invention may be regarded as an improvement in the brake which is the subject matter of United States Letters Patent No. 1,123,786, issued to me January 5, 1915.

The invention will be best understood by reference to the following description when taken in connection with the accompanying drawings of one specific embodiment thereof, while its scope will be more particularly pointed out in the appended claims.

In the drawings:

Figure 1 is an end elevation partly broken away and partly in vertical section of a brake mechanism exemplifying my invention;

Fig. 2 is a detail sectional view looking in the same direction as Fig. 1;

Fig. 3 is a detail sectional view on line 3—3 of Fig. 1;

Fig. 4 is a side elevation of the brake mechanism viewed from the left hand side of Fig. 1;

Fig. 5 is a detail plan, partly in horizontal section, of a portion of the brake mechanism; and Fig. 6 is an elevation, partly in vertical section, of the parts shown in Fig. 5 as viewed from the right hand side thereof.

Referring to the drawings, and to the embodiment of my invention which I have selected for exemplification, I have shown a brake comprising a movable body, herein exemplified by a brake-drum 8 which cooperates with a brake member, herein exemplified by a brake-shoe 10 conveniently in the form of a band provided with two relatively movable terminals 12 and 14. If desired, the band may be provided with an adjustable take-up, herein exemplified by a bolt 16 extending through lugs 18 on two distinct parts of the band, said bolt being provided with adjusting nuts 20.

In the present example, as in the aforesaid patent, the brake is normally automatic in its action, that is to say, free rotation is permitted in one direction but is prevented in the opposite direction.

Herein the brake band terminals 12 and 14 are differentially connected to a hanger, herein a link 22, best shown in Fig. 2, which is pivoted at 24 on a suitabe fixed support, herein a frame 26 which supports the working parts of the brake mechanism. The terminal 12 is connected by one or more, herein a pair of, links 28 and a pivot 29 to the link 22 at a point relatively near the pivot 24, while the terminal 14 is connected to the link 22 at a point relatively distant from said pivot in a manner which will presently appear. A suitably arranged spring 30 urges the rocking link 22 toward the left, that is to say, when considered with reference to the brake drum, clockwise. Movement of the link in such direction is limited by an appropriate stop 32, herein conveniently formed as an integral part of the frame 26, while the spring selected for exemplification is a compression spring helically coiled about a rod 34, which passes freely through an opening 36 provided in the link 22, and thence through the stop 32 which presents a mounting therefor. One end of the spring rests against a suitable abutment, herein a washer 38 encircling the rod and resting against a suitably curved surface 40, which permits a limited rocking movement of the link 22 with relation to the rod 34. The other end of the spring rests against an adjustable abutment, herein conveniently in a form of adjusting nuts 42 threaded onto a rod.

The relative arrangement of parts thus far described is such that when the brake-drum is rotated contraclockwise, as viewed in Figs. 1 and 2, the spring 30 yields and allows the link 22 to swing toward the right, Fig. 2, the differential action on the brake-band terminals thereby permitting the brake-band to relax, but when, on the other hand, there is any tendency of the brake-drum to rotate clockwise, it is resisted by automatic application of the band under the influence of the spring. However, the brake may be released at will to any degree by moving the terminal 14 independently of the link 22 contraclockwise considered with reference to the brake-drum. This is conveniently accompished by connecting the terminal 14 to the link 22 by means of a rocking lever 44, which herein is bifurcated to embrace the terminal. The link 22 in turn is bifurcated to embrace the rocking lever 44. This is well illustrated in Figs. 5 and 6. When the lever 44 is rocked clockwise about its fulcrum upon the link 22, the brake-band is relaxed, thereby freeing the brake-drum and allowing it to rotate clockwise. It should here be noted that this release of the brake is effected without disturbing the spring 30 and link 22,—that is to say, it is accomplished irrespective of the action of the automatic brake-applying means.

The lever 44 is manually controlled by a mechanism now to be described, reference being had more particularly to Fig. 1. One arm 45 of the lever is connected by a link 46 to one arm 47 of a lever 48 which is fulcrumed on a pivot 50, herein conveniently formed as a prolongation of the pivot 24 and mounted in suitable bearings 52 on the frame 26 (see Figs. 5 and 6). The link 46 is arranged parallel with a straight line containing the centers of the fulcra of the links 22 and 44, and hence does not interfere with the releasing action of the link 22. The lever 48 is provided with a second arm 54 which is appropriately connected to a suitable actuator 56, herein a manually operable lever provided with a grasping portion 58. This lever is fulcrumed at 60 on a suitable support, herein a bracket 62, and is provided with one or more, herein a pair of arms 64 connected to the arm 54 by connections now to be described.

The arms 54 and 64 are connected to each other by a link 66, herein yieldingly connected to the arm 54. In the present example, the latter carries a sleeve 68 which is pivoted and presents a guide for the link, as well as an abutment for two springs 70 and 72 which encircle the link and rest against opposite ends of the sleeve. The outer end of the spring 72 rests against an adjustable abutment conveniently in the form of a pair of nuts 74 threaded onto the outer end of the link.

The spring 70 normally maintains the hand lever 56 in an upright position. When the lever 56 is swung toward the left, that is to say contraclockwise, it tends to place the spring 72 under compression and in so doing acts through the arms 54 and 47, link 46 and lever 44, to effect release of the brake. Since the releasing movement is through the interposition of a spring, the release and reapplication of the brake can be controlled to a nicety and it can be applied and released much more gradually and sensitively than would otherwise be possible.

There is also connected to the lever 48 a spring 76 which yieldably resists brake-releasing movement of said lever and restores the latter to its brake-applying position. This spring may be connected to the lever 70 as by providing the latter with a third arm 78 to which is pivoted a rod 80 carrying an abutment 82 against which one end of the spring rests while the other end of the spring is seated against a fixed abutment 84. At times it is desirable to release the brake and have it held in its released position without intervention of the operator so that the latter can have free use of both hands in manipulating or in arranging a rope about the drum in the event that the brake mechanism is associated with a rope winding apparatus such as a winch. The spring 76 furnishes a convenient means automatically to hold the brake mechanism in its released position by the mere movement of the hand lever beyond a predetermined point in its travel. To this end the arm 78 and rod 80 herein constitute a toggle. The rod is mounted to slide in a guide 86 (see Fig. 3) against which the abutment 84 rests and this guide is provided with a pivot 88 (see Fig. 3) which turns in a bearing provided therefor in the bracket 62. When, therefore, the arm 78 swings to and fro the rod 80 slides backward and forward in the guide 86 and the latter rocks on its pivotal mounting. If now the releasing movement be carried to such an extent that the toggle straightens until its central pivot reaches or passes the "dead center" (a line A—A joining the centers of the pivots 50 and 88), the power of the spring 76 will no longer be effective to restore the lever to the brake-applying position and the brake will therefore remain released. Preferably the toggle is moved to a position slightly beyond the "dead center" and preferably also there is provided a stop conveniently in the form of a pin 90 secured to the bracket 62 and limiting swinging movement of the arm 78. The brake is reapplied in an obvious manner by reversal of the foregoing operation.

The general operation should be evident from the foregoing description, but may be summarized as follows: The normal position of the parts is as shown in the drawings. Normally, the brake is automatic in its operation, permitting free rotation of the drum contra-clockwise as viewed in Fig. 1, but preventing clockwise rotation. This permits winding on of the rope, but prevents unwinding. If now, the operator wishes to permit the rope to unwind, he swings the lever 56 toward the left, as viewed in Fig. 1, thereby effecting release of the brake to whatever extent is desired, through the intervention of the spring 72. Reapplication of the brake is effected by simply allowing the lever to be restored to its normal position by the action of the spring 76.

Having thus described one embodiment of my invention, but without limiting myself thereto, what I claim and desire by Letters Patent to secure is:

1. In a brake mechanism, the combination of a brake automatically effective in one direction only, and brake-actuating means including a spring through which the brake-releasing force is exerted in releasing said brake to render the same ineffective.

2. In a brake mechanism, the combination of a brake including a movable body, yielding means normally effective automatically to cause application of said brake, to resist movement of said body in one direction only, and brake-releasing means including a spring which yieldingly resists release of said brake at the will of the operator to permit movement of said body in said direction.

3. In a brake mechanism, the combination of a brake, yielding means automatically to cause application of said brake, and brake-releasing means for causing release of said brake without disturbing said yielding means, said releasing means including yielding means, which yieldingly resists release of said brake.

4. In a brake mechanism, the combination of a brake, yielding means automatically to cause application of said brake, and brake-releasing means for causing release of said brake irrespective of the action of the brake-applying means, said brake-releasing means including a spring which yieldingly resists brake-releasing movement.

5. In a brake mechanism, the combination of a brake, including a movable body, means automatically to cause application of said brake to resist movement of said body in one direction and to permit movement of said body in the opposite direction, and brake-releasing means including a spring through which the brake-releasing force is applied in releasing said brake.

6. In a brake mechanism, the combination of a brake, including a movable body, means automatically to cause application of said brake to resist movement of said body in one direction and to permit movement of said body in the opposite direction, means including an actuator and a spring actuated thereby at will to cause release of said brake.

7. In a brake mechanism, the combination of a brake, including a movable body, means automatically to cause application of said brake to resist movement of said body in one direction and to permit movement of said body in the opposite direction, and brake-releasing means including a spring which yieldingly resists release of said brake.

8. In a brake mechanism, the combination of a brake, including a movable body, means automatically to cause application of said brake to resist movement of said body in one direction and to permit movement of said body in the opposite direction, and brake-releasing means for causing release of said brake irrespective of the action of said brake-applying means, said brake-releasing means including a spring which yieldingly resists brake-releasing movement.

9. In a brake mechanism, the combination of a brake including a movable body, means automatically to cause application of said brake to resist movement of said body in one direction, and to permit movement of said body in the opposite direction, brake-releasing means for causing release of said brake irrespective of the action of said brake-applying means, and means operated by said brake-releasing means to hold said brake in its released position.

10. In a brake mechanism, the combination of a brake including a movable body, means automatically to cause application of said brake to resist movement of said body in one direction, and to permit movement of said body in the opposite direction, brake-releasing means for causing release of said brake irrespective of the action of said brake-applying means, and means automatically to hold said brake in its released position by the mere movement of said brake to such position.

11. In a brake mechanism, the combination of a brake including a movable body, means automatically to cause application of said brake to resist movement of said body in one direction, and to permit movement of said body in the opposite direction, brake-releasing means for causing release of said brake irrespective of the action of said brake-applying means, a spring, and means cooperating with said spring and with said brake to utilize said spring to urge said brake either toward a released position or toward an applied position.

12. In a brake mechanism, the combination of a brake including a movable body, means automatically to cause application of said brake to resist movement of said body in one direction, and to permit movement of said body in the opposite direction, brake-releasing means for causing release of said brake irrespective of the action of said brake-applying means, connected with said brake having a dead center at one side of which said brake is released and at the other side of which said brake is applied, and a spring connected to the last-mentioned means to urge the latter in either direction when moved past said dead center.

13. In a brake mechanism, the combination of a brake, operating means for applying and releasing said brake, a toggle connected to said operating means, and a spring the force of which may be applied through said toggle to urge said brake operating means toward a brake-releasing position or toward a brake-applying position.

14. In a brake mechanism, the combination of a brake; brake-applying means; and brake-releasing means including a hand-lever and a spring through which the brake-releasing force applied by said hand lever is exerted in releasing said brake.

15. In a brake mechanism, the combination of a brake; brake-applying means; brake-releasing means including a hand lever and a spring through which the brake-releasing force applied by said hand lever is exerted in releasing said brake; and a spring yieldably retaining said hand-lever in its normal position.

16. In a brake mechanism, the combination of a brake; a spring which resists manual release of said brake; and brake-releasing means including a hand-lever and a spring through which the brake-releasing force is applied by said hand-lever in releasing said brake in opposition to the first-mentioned spring.

17. In a brake mechanism, the combination of a brake including a brake-drum; a spring which yields and permits said brake-drum to rotate in one direction but automatically prevents rotation of said brake-drum in the reverse direction; a spring which resists manual release of said brake; and brake-releasing means including a hand-lever and a spring through which the brake-releasing force is applied by said hand-lever in releasing said brake in opposition to the second-mentioned spring.

18. In a brake mechanism, the combination of a brake including a brake-drum; a spring which yields and permits said brake-drum to rotate in one direction but automatically prevents rotation of said brake-drum in the reverse direction; a spring which resists manual release of said brake; brake-releasing means including a hand-lever and a spring through which the brake-releasing force is applied by said hand-lever in releasing said brake in opposition to the second-mentioned spring; and a spring yieldably retaining said hand-lever in its normal position.

19. In a brake mechanism, the combination of a brake; brake-applying means; a spring which resists manual release of said brake; and brake-releasing means including a hand lever, and a spring through which the brake-releasing force is applied by said hand lever in releasing said brake and through which the first-mentioned spring acts in restoring said hand lever to its normal position.

20. The combination with a rotatable member of a brake therefor, the latter having a band and provided with a swinging link to which the ends of the band are attached, a brake-controlling lever arm fulcrumed on the link and constituting the connection between the link and one end of the band, the arrangement being such that the band tends to tighten on movement in one direction and to loosen on movement in the opposite direction, a brake-controlling lever for releasing the brake to permit said member to rotate in the first-mentioned direction, said lever being pivoted independently of the link.

21. The combination with a rotatable member of a brake therefor, the latter having a band and provide with a swinging link to which the ends of the band are attached, a brake-controlling lever arm fulcrumed on the link and constituting the connection between the link and one end of the band, the arrangement being such that the band tends to tighten on movement in one direction and to loosen on movement in the opposite direction, a brake-controlling lever for releasing the brake to permit said member to rotate in the first-mentioned direction, said lever having connections to said controlling lever arm which provide for a relaxing movement of said arm when either said lever or said link is moved.

22. The combination with a rotatable member of a brake therefor, the latter having a band and provided with a swinging link to which the ends of the band are attached, a brake-controlling lever arm fulcrumed on the link and constituting the connection between the link and one end of the band, the arrangement being such that the band tends to tighten on movement in one direction and to loosen on movement in the opposite direction, a brake-controlling lever for releasing the brake to permit said member to rotate in the first-mentioned direction, said lever having a fixed fulcrum and linkage connections to said controlling lever arm.

In testimony whereof, I have signed my name to this specification.

ALMON E. NORRIS.